United States Patent
Heger et al.

(10) Patent No.: US 12,216,519 B2
(45) Date of Patent: Feb. 4, 2025

(54) DETECTING WEAR STATUS OF WEARABLE DEVICE

(71) Applicant: Snap Inc., Santa Monica, CA (US)

(72) Inventors: Jason Heger, Louisville, CO (US); Dunxu Hu, Venice, CA (US); Eric Nachtigall, Broomfield, CO (US); Gerald Nilles, Culver City, CA (US); Ugur Olgun, Marina Del Rey, CA (US); Praveen Babu Vadivelu, Broomfield, CO (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/820,451

(22) Filed: Aug. 17, 2022

(65) Prior Publication Data

US 2024/0061491 A1    Feb. 22, 2024

(51) Int. Cl.
*G06F 1/3231* (2019.01)
*G06F 1/16* (2006.01)
*G06F 3/14* (2006.01)
*H04B 17/318* (2015.01)

(52) U.S. Cl.
CPC ............ *G06F 1/3231* (2013.01); *G06F 1/163* (2013.01); *G06F 3/14* (2013.01); *H04B 17/318* (2015.01)

(58) Field of Classification Search
CPC .......... G06F 1/3231; G06F 1/163; G06F 3/14; G06F 3/013; G06F 3/012; G06F 3/0346; G06F 3/011; H04B 17/318; G02B 27/017; G02B 2027/0178; G06T 19/006; G09G 2330/021; H04R 25/43; H04R 25/554; H04R 25/00; H04R 25/65; H04R 25/305
See application file for complete search history.

(56) References Cited

U.S. PATENT DOCUMENTS

| | | | |
|---|---|---|---|
| 7,971,156 B2 | 6/2011 | Albertson et al. |
| 8,032,602 B2 | 10/2011 | Lavoie et al. |
| 8,275,859 B2 | 9/2012 | Burckart et al. |
| 8,531,355 B2 | 9/2013 | Maltz |

(Continued)

FOREIGN PATENT DOCUMENTS

| | | |
|---|---|---|
| CN | 110800012 A | 2/2020 |
| CN | 111930241 A | 11/2020 |

(Continued)

OTHER PUBLICATIONS

"International Application Serial No. PCT/US2023/030154, International Search Report mailed Nov. 3, 2023", 3 pgs.

(Continued)

*Primary Examiner* — Matthew A Eason
*Assistant Examiner* — Sujit Shah
(74) *Attorney, Agent, or Firm* — Schwegman Lundberg & Woessner, P.A.

(57) ABSTRACT

Methods and systems are disclosed for detecting whether a wearable device is being worn by a user. The system transmits a radio signal from a first communication device of a wearable device to a second communication device of the wearable device and measures a signal strength associated with the radio signal received by the second communication device. The system compares the signal strength to a threshold value and generates an indication of a wear status associated with the wearable device based on comparing the signal strength to the threshold value.

19 Claims, 11 Drawing Sheets

(56) References Cited

U.S. PATENT DOCUMENTS

| | | |
|---|---|---|
| 8,531,394 B2 | 9/2013 | Maltz |
| 8,990,327 B2 | 3/2015 | Drews et al. |
| 9,532,171 B2 | 12/2016 | Allen et al. |
| 9,557,812 B2 | 1/2017 | Maltz |
| 9,608,949 B2 | 3/2017 | Skyrm et al. |
| 9,854,219 B2 | 12/2017 | Sehn |
| 9,911,073 B1 | 3/2018 | Spiegel et al. |
| 9,946,067 B1 | 4/2018 | Bamberger et al. |
| 9,984,499 B1 | 5/2018 | Jurgenson et al. |
| 10,091,221 B1 | 10/2018 | Yang et al. |
| 10,102,423 B2 | 10/2018 | Shaburov et al. |
| 10,198,819 B2 | 2/2019 | Kudriashov et al. |
| 10,204,137 B2 | 2/2019 | Shim et al. |
| 10,219,110 B2 | 2/2019 | Davis et al. |
| 10,219,111 B1 | 2/2019 | Chen et al. |
| 10,242,477 B1 | 3/2019 | Charlton et al. |
| 10,242,503 B2 | 3/2019 | McPhee et al. |
| 10,244,186 B1 | 3/2019 | Chen et al. |
| 10,285,001 B2 | 5/2019 | Allen et al. |
| 10,311,644 B2 | 6/2019 | Rodriguez, II |
| 10,324,942 B2 | 6/2019 | Yang et al. |
| 10,331,743 B2 | 6/2019 | Lo |
| 10,339,365 B2 | 7/2019 | Gusarov et al. |
| 10,341,304 B1 | 7/2019 | Boutros et al. |
| 10,360,708 B2 | 7/2019 | Bondich et al. |
| 10,366,543 B1 | 7/2019 | Jurgenson et al. |
| 10,423,983 B2 | 9/2019 | Shim et al. |
| 10,467,274 B1 | 11/2019 | Ren et al. |
| 10,474,321 B2 | 11/2019 | Patel et al. |
| 10,489,821 B2 | 11/2019 | Soloff |
| 10,496,875 B1 | 12/2019 | Chang |
| 10,523,606 B2 | 12/2019 | Kozhemiak et al. |
| 10,593,116 B2 | 3/2020 | Egri et al. |
| 10,602,057 B1 | 3/2020 | Sehn |
| 10,614,828 B1 | 4/2020 | Cowburn et al. |
| 10,616,239 B2 | 4/2020 | Allen et al. |
| 10,616,476 B1 | 4/2020 | Ebsen et al. |
| 10,694,099 B1 | 6/2020 | Yan et al. |
| 10,726,306 B1 | 7/2020 | Yang et al. |
| 10,733,255 B1 | 8/2020 | Yang et al. |
| 10,817,898 B2 | 10/2020 | Waldron et al. |
| 10,824,654 B2 | 11/2020 | Chang et al. |
| 10,887,308 B1 | 1/2021 | Spiegel |
| 10,911,575 B1 | 2/2021 | Pavlovskaia et al. |
| 10,949,655 B2 | 3/2021 | Shaburov et al. |
| 10,950,271 B1 | 3/2021 | Shaburova et al. |
| 10,956,793 B1 | 3/2021 | Wang et al. |
| 10,993,069 B2 | 4/2021 | Son et al. |
| 11,023,514 B2 | 6/2021 | Allen et al. |
| 11,099,643 B1 | 8/2021 | Miller et al. |
| 11,189,104 B2 | 11/2021 | Goodrich et al. |
| 11,212,482 B2 | 12/2021 | Monastyrshyn et al. |
| 11,216,869 B2 | 1/2022 | Allen et al. |
| 11,252,541 B2 | 2/2022 | Wu et al. |
| 11,256,414 B2 | 2/2022 | Brody et al. |
| 11,488,361 B1 * | 11/2022 | Ng .................. G06T 19/006 |
| 2015/0126234 A1 * | 5/2015 | Rodriguez ........ H04M 1/72412 |
| | | 455/457 |
| 2016/0157062 A1 | 6/2016 | Shim et al. |
| 2016/0210545 A1 | 7/2016 | Anderton et al. |
| 2016/0239248 A1 | 8/2016 | Sehn |
| 2017/0221272 A1 | 8/2017 | Li et al. |
| 2017/0229095 A1 * | 8/2017 | Raffle .................... G09G 5/12 |
| 2017/0287006 A1 | 10/2017 | Azmoodeh et al. |
| 2017/0289234 A1 | 10/2017 | Andreou et al. |
| 2017/0295250 A1 | 10/2017 | Samaranayake et al. |
| 2018/0025219 A1 | 1/2018 | Baldwin et al. |
| 2018/0075651 A1 | 3/2018 | Hare et al. |
| 2018/0091202 A1 * | 3/2018 | Azogui ................ H04W 4/023 |
| 2018/0107866 A1 | 4/2018 | Li et al. |
| 2018/0121762 A1 | 5/2018 | Han et al. |
| 2018/0124299 A1 | 5/2018 | Brook |
| 2018/0143748 A1 | 5/2018 | Ahmed et al. |
| 2018/0210628 A1 | 7/2018 | Mcphee et al. |
| 2019/0146219 A1 | 5/2019 | Rodriguez, II |
| 2019/0335095 A1 | 10/2019 | Yan et al. |
| 2020/0105304 A1 | 4/2020 | Sehn |
| 2020/0152238 A1 | 5/2020 | Li et al. |
| 2020/0160580 A1 | 5/2020 | Cao et al. |
| 2020/0250888 A1 | 8/2020 | Mcphee et al. |
| 2020/0264455 A1 | 8/2020 | Olgun et al. |
| 2020/0348540 A1 * | 11/2020 | Nepola .................. G02C 11/10 |
| 2020/0356241 A1 | 11/2020 | Al Majid et al. |
| 2020/0410763 A1 | 12/2020 | Hare et al. |
| 2021/0027100 A1 | 1/2021 | Bogdanovych et al. |
| 2021/0149224 A1 * | 5/2021 | Zhang .................... G02C 11/10 |
| 2021/0225077 A1 | 7/2021 | Ge et al. |
| 2021/0256773 A1 | 8/2021 | Hare et al. |
| 2021/0266277 A1 | 8/2021 | Allen et al. |
| 2021/0382503 A1 | 12/2021 | Meisenholder et al. |
| 2021/0386366 A1 * | 12/2021 | Zakharov .............. A61B 3/00 |
| 2021/0392465 A1 | 12/2021 | Charlton et al. |
| 2022/0031515 A1 * | 2/2022 | Becker .................. G02C 7/104 |
| 2022/0038416 A1 | 2/2022 | Allen et al. |
| 2022/0044479 A1 | 2/2022 | Hare et al. |
| 2022/0076017 A1 | 3/2022 | Cowburn et al. |
| 2022/0084537 A1 * | 3/2022 | Wexler .................. G10L 15/24 |
| 2022/0141552 A1 | 5/2022 | Tang |
| 2022/0179496 A1 * | 6/2022 | Su .......................... G06N 20/00 |
| 2022/0230649 A1 * | 7/2022 | Kim ...................... G10L 15/005 |
| 2022/0377450 A1 * | 11/2022 | Dai ........................ H04R 1/1041 |

FOREIGN PATENT DOCUMENTS

| | | |
|---|---|---|
| CN | 114504159 A | 5/2022 |
| WO | WO-2019000742 A1 | 1/2019 |
| WO | WO-2024039605 A1 | 2/2024 |

OTHER PUBLICATIONS

"International Application Serial No. PCT/US2023/030154, Written Opinion mailed Nov. 3, 2023", 12 pgs.

* cited by examiner

… (1)

DETECTING WEAR STATUS OF WEARABLE DEVICE

TECHNICAL FIELD

The present disclosure relates generally to providing augmented reality experiences and other functionalities using wearable devices.

BACKGROUND

Augmented Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like. Such AR and VR experiences are usually conducted using wearable devices, such as AR glasses and VR headsets.

BRIEF DESCRIPTION OF SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
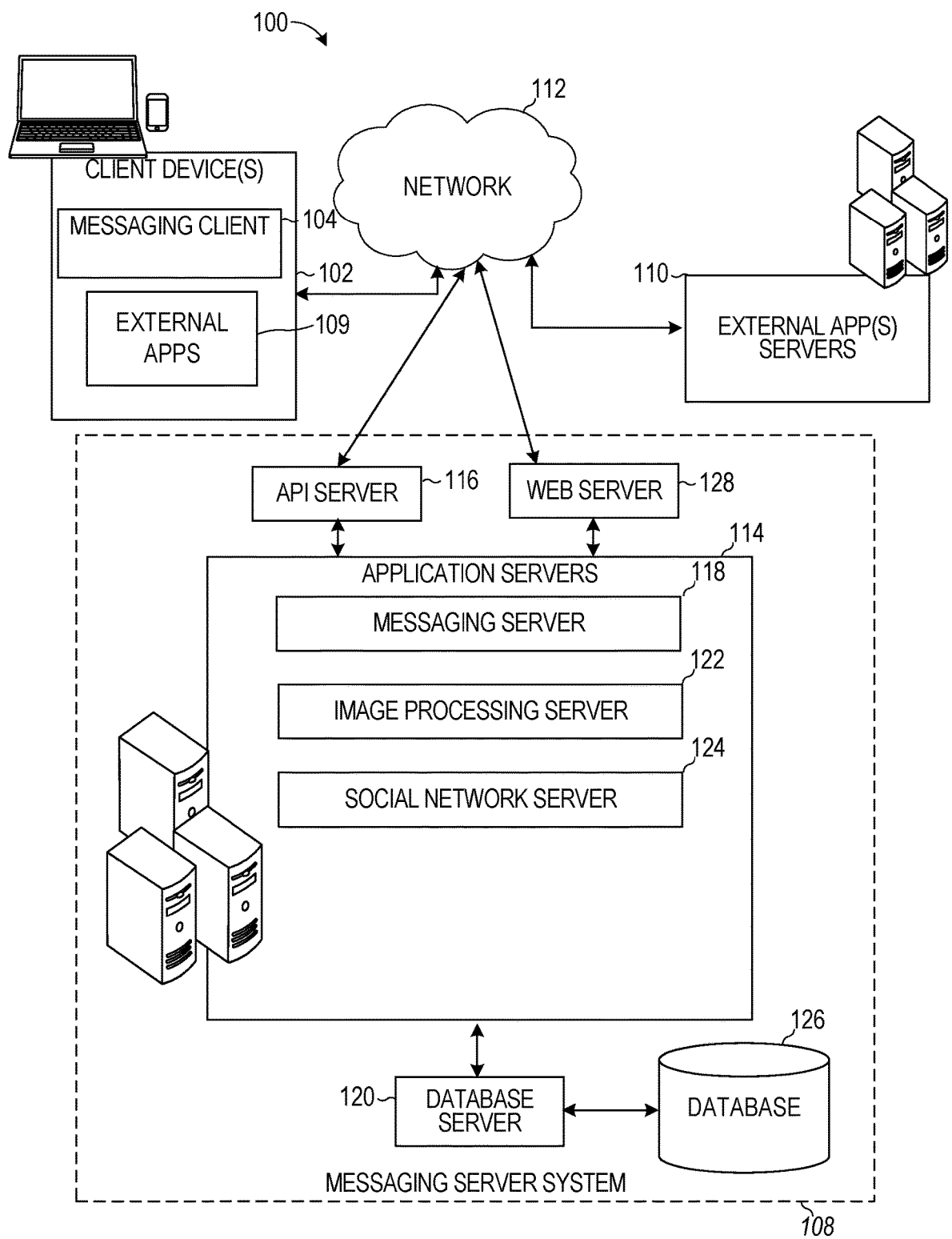
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typical user devices can run a wide variety of complex AR experiences ranging from music playback to complex depth and object tracking, to rich graphics-intensive experiences. Running such AR experiences can be limited due to battery life of a target device. Specifically, the power consumed by these AR experiences largely depends on the complexity of the AR experiences that are being run, and the greater the complexity, the greater the battery drain on the target devices. Managing battery consumption on wearable devices, particularly those used to operate AR experiences, is very important to users. Typically, the wearable devices have power ON/OFF buttons to allow users to control the power consumed by the wearable devices when not in use. However, sometimes users forget to turn OFF the wearable devices which results in battery waste. While these devices can automatically power down after some time, there is a long time interval between when the wearable device is removed and when the wearable device is automatically powered down, which wastes battery.

Some typical systems use capacitive sensors or proximity sensors to detect presence of a body part of a user to determine whether the wearable devices are being worn or used. However, these sensors can consume physical real estate on the devices and can increase the costs associated with the devices. Also, these sensors can themselves consume a great deal of energy and drain the batteries of the wearable device making their use counterproductive. Some other systems leverage optical sensors to detect presence of the body part and to determine that the devices are being worn. Such optical systems, though, need an exposed opening on the device to be provided, which makes the devices more susceptible to damage, such as from water and the environment. These optical systems also consume some insignificant amount of device real estate making them less desirable to implement.

The disclosed techniques improve the efficiency of using the electronic device by providing an automated mechanism to determine whether a wearable device is being worn in order to automatically power down certain functionality of the device and save battery resources. The disclosed techniques use a cost-effective method that consumes a very small amount of physical hardware resources to perform the detection of whether the wearable device is being worn. Particularly, the disclosed techniques use a pair of communication devices (e.g., a transmitter and receiver) positioned on opposite ends or relative to one another on the wearable device. The disclosed techniques measure a signal strength of a radio signal exchanged between the communication devices to determine the wear status of the wearable device. For example, if the signal strength is greater than a threshold, the disclosed techniques determine that the wearable device is not currently being worn and can power down certain components in response. Similarly, if the signal strength is less than the threshold, the disclosed techniques determine that the wearable device is currently being worn and can run or operate the components (e.g., an AR/VR application or experience) in response.

In this way, the disclosed techniques can reduce power consumption and waste and improve the overall functioning of the device. This improves the overall experience of the user in using the electronic device and reduces the overall amount of system resources needed to accomplish a task.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108, and external app(s) servers 110 via a network 112 (e.g., the Internet). A messaging client 104 can also communicate with locally hosted third-party applications, such as external apps 109 using Application Programming Interfaces (APIs).

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions), as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108, but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 include an image processing server 122 that is dedicated to performing various image processing operations, typically with respect to images or video within the payload of a message sent from or received at the messaging server 118.

Figure 2:
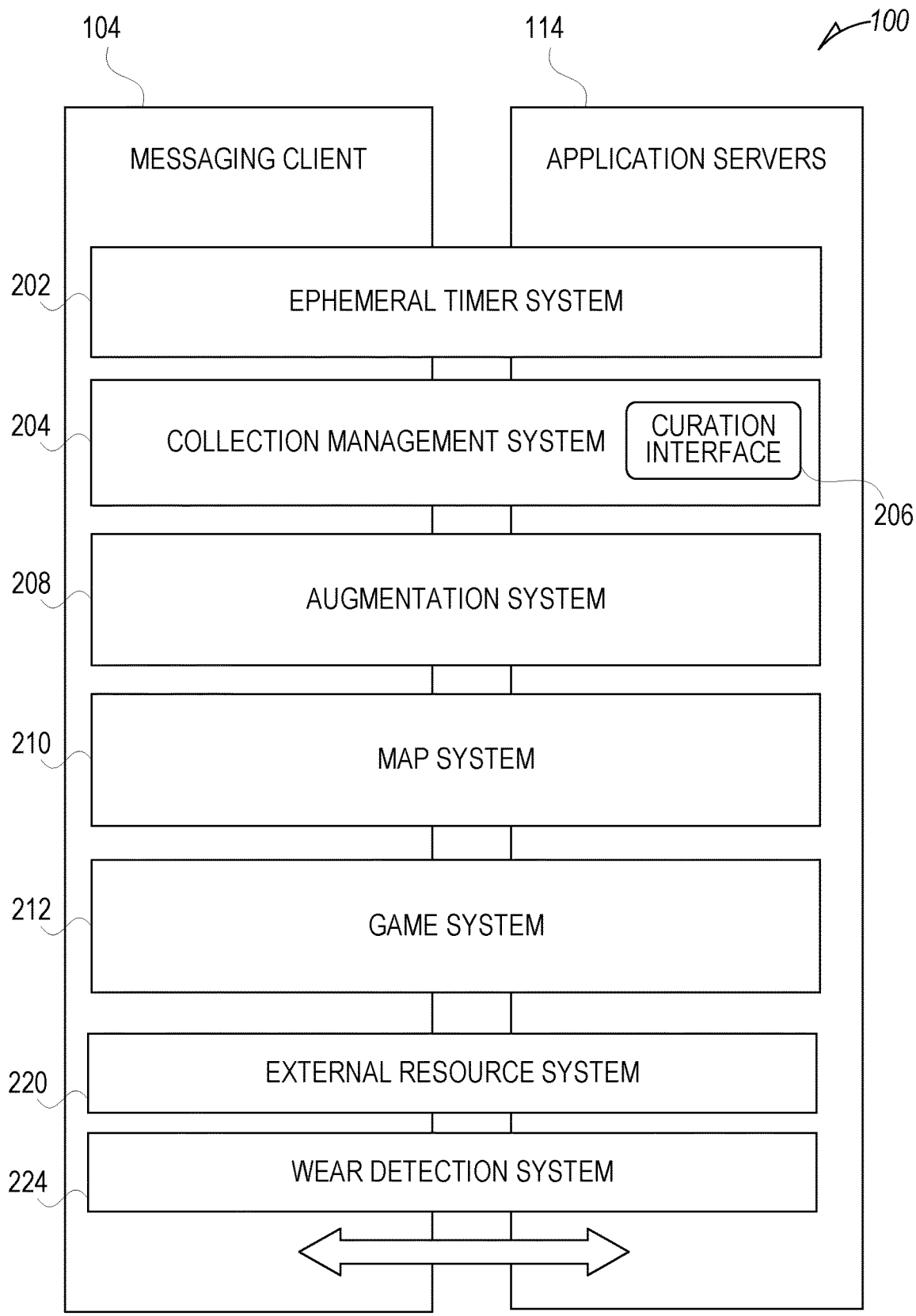
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more AR experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification (e.g., replacing a garment being worn by a user in a video or recoloring the garment worn by the user in the video or modifying the garment based on a gesture performed by the user).

Figure 3:
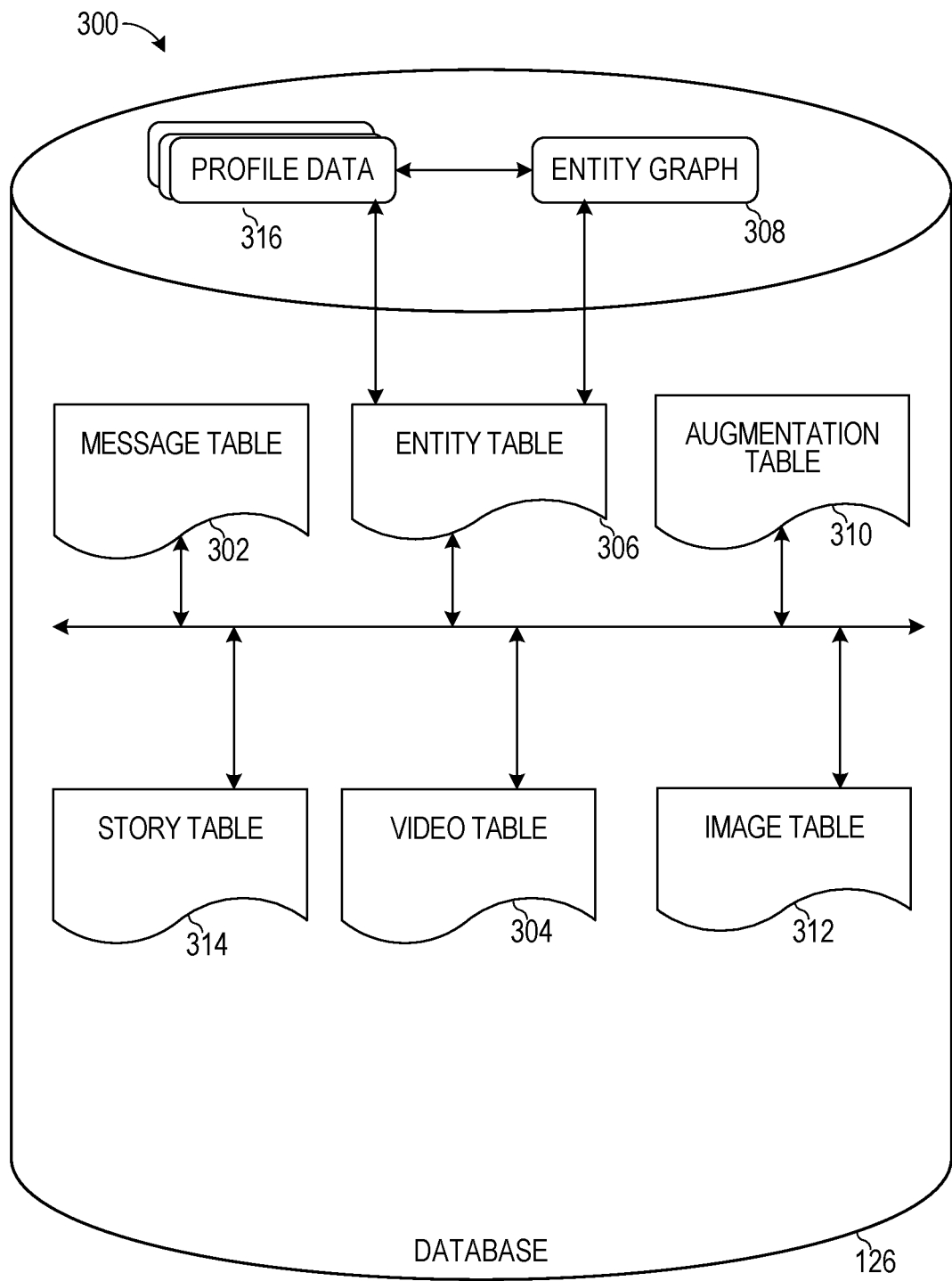
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally installed, external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally installed external application 109, the messaging client 104 instructs the client device 102 to launch the external application 109 by executing locally stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently used, but currently inactive (in the group of friends), external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can perform different sets of operations and functions and/or enable/disable different features based on a wear status of the client device 102 (e.g., a wearable device). In some cases, the messaging client 104 can perform a set of operations that consume a first amount of resources while the wear status indicates that the client device 102 is being worn by a user. In some cases, the messaging client 104 can prevent or stop performing the set of operations that consume the first amount of resources while the wear status indicates that the client device 102 is not being worn by a user. In such cases, the messaging client 104 can transition to performing a second set of operations that consumes a second amount of resources fewer than the first amount of resources.

System Architecture

FIG. 2 is a block diagram illustrating further details regarding the messaging system 100 of FIG. 1, according to some examples. Specifically, the messaging system 100 of FIG. 2 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content, and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or an image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102, and with the server via the network 112. The data exchanged can include a session identifier that identifies the shared AR session, a transformation between a first client device 102 and a second client device 102 (e.g., a plurality of client devices 102 includes the first and second devices) that is used to align the shared AR session to a common point of origin, a common coordinate frame, functions (e.g., commands to invoke functions) as well as other payload data (e.g., text, audio, video or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system, or frame, as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In some examples, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 of FIG. 1 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript, leveraging a Software Development Kit (SDK) provided by the messaging server 118 of FIG. 1. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface (GUI) of the messaging client 104 to access features of the web-based external resource, the messaging client 104 obtains the HTML5 file and instantiates the resources necessary to access the features of the web-based external resource.

The messaging client 104 presents a GUI (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another GUI of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, three-dimensional (3D) avatars of users, and avatars with various avatar characteristics). Avatar characteristics include different ways to customize a look and feel of an avatar, such as different poses, facial features, clothing, and so forth.

A wear detection system 224 can be used by a developer of an AR experience or an end user of the AR experience on a messaging client 104. The wear detection system 224 can selectively apply one or more resource utilization parameters or data (e.g., hardware resource consumption information) of a given AR experience based on a current wear status of the client device 102 of FIG. 1 (e.g., an indication of whether the client device 102 is being worn by a user).

For example, a selection of an AR experience can be received from the messaging client 104. The AR experience can be executed by the messaging client 104 and the wear detection system 224 can generate radio signals for transmission between two integrated communication devices (e.g., radio-frequency transmitters/receivers). Based on a signal strength between the two communication devices, the wear detection system 224 can determine whether the client device 102 is being worn or not. The wear detection system 224 can select between different versions of the AR experience (or selectively activate features of the AR experience) based on the wear status to control the amount of power consumed by the client device 102 while not being worn by the user.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and to profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based, or activity-based, merely for example.

The profile data 316 stores multiple types of profile data about a particular entity. The profile data 316 may be selectively used and presented to other users of the messaging system 100 of FIG. 1, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 of FIG. 1 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 of FIG. 1 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104 based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such methods, a background of the modified object can be changed or distorted as well by tracking and modifying the background.

In some examples, transformations changing some areas of an object using their elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102, having a neural network operating as part of a messaging client 104, operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a GUI displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The GUI, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a GUI. In some examples, individual faces, among a group of multiple faces, may be individually modified, or such modifications may be individually toggled by tapping or selecting the individual face or a series of individual faces displayed within the GUI.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user, whose client device 102 is located within a specific geographic location (e.g., on a college or university campus), to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
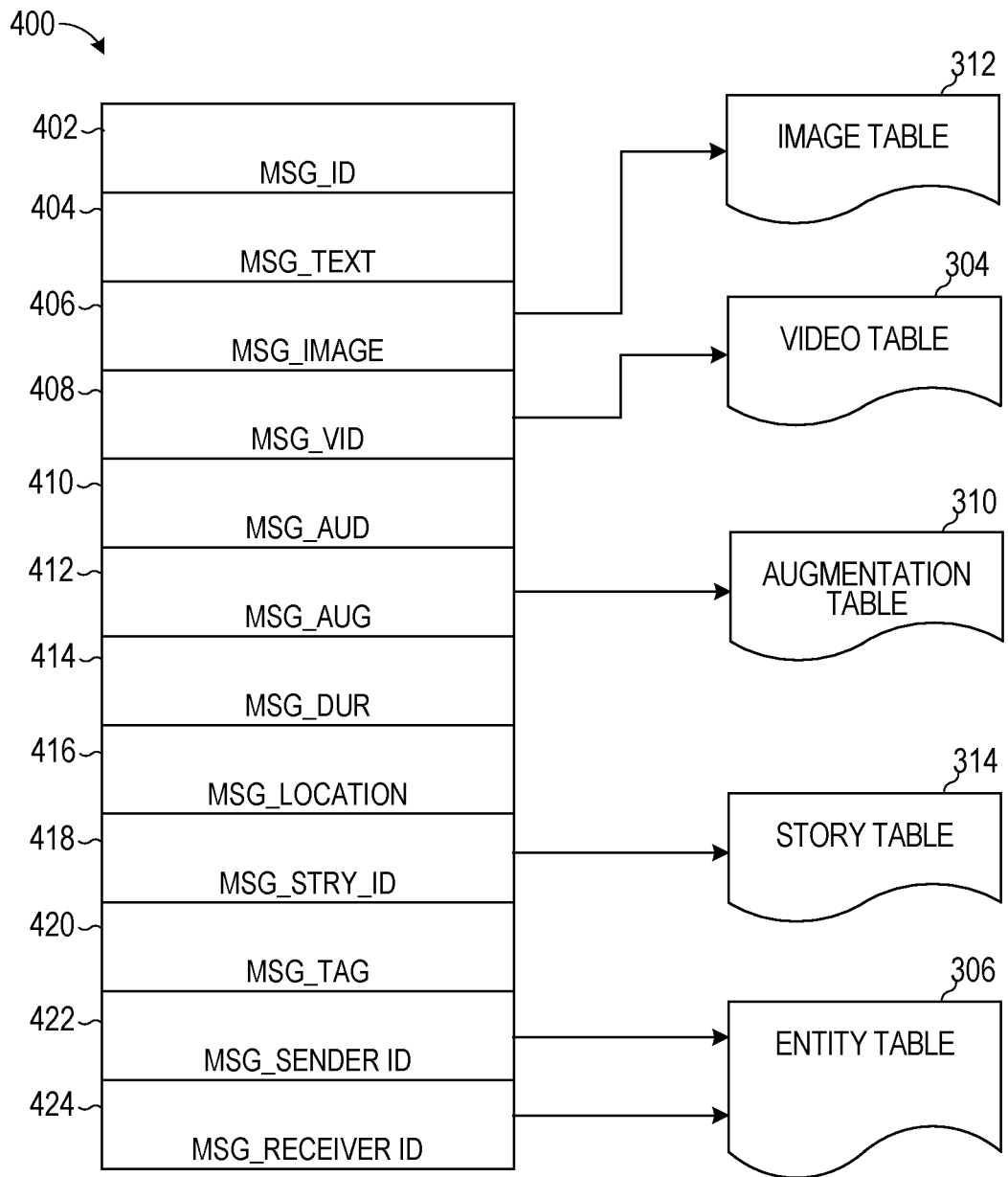
FIG. 4 is a diagrammatic representation of a message, in accordance with some examples.

FIG. 4 is a schematic diagram illustrating a structure of a message 400, according to some examples, generated by a messaging client 104 of FIG. 1 for communication to a further messaging client 104 or the messaging server 118 of FIG. 1. The content of a particular message 400 is used to populate the message table 302 stored within the database 126 and accessible by the messaging server 118. Similarly, the content of a message 400 is stored in memory as "in-transit" or "in-flight" data of the client device 102 of FIG. 1 or the application servers 114 of FIG. 1. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Wear Detection System

Figure 5:
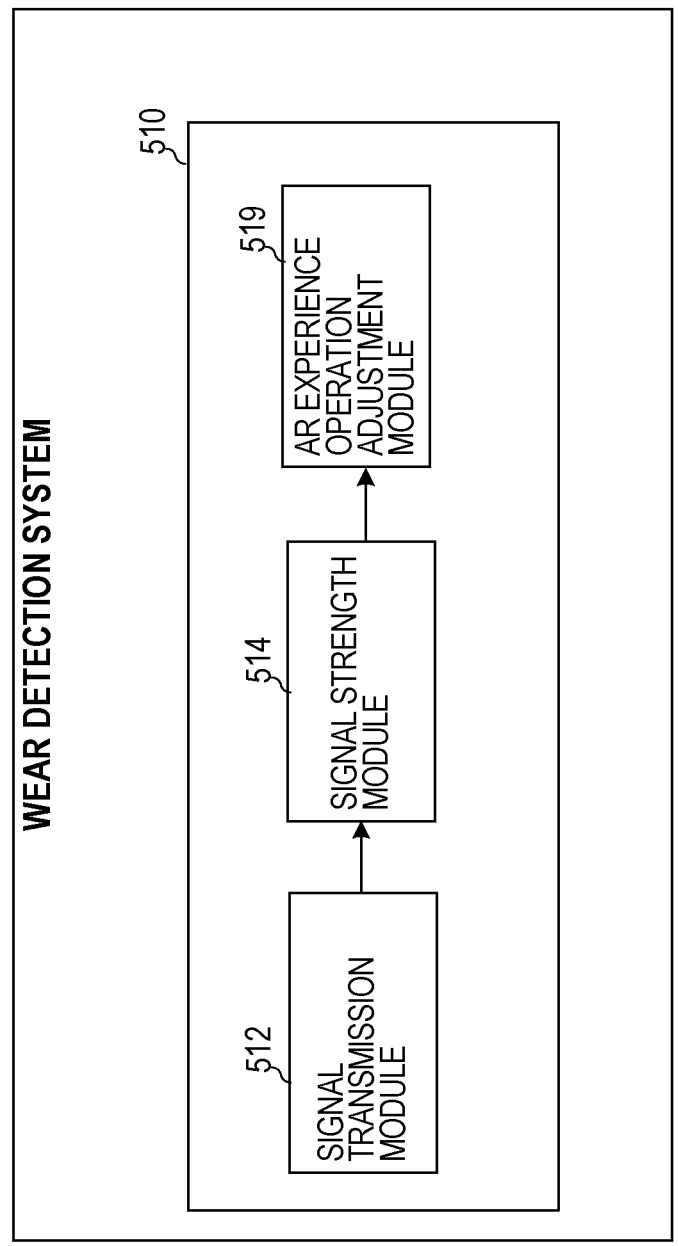
FIG. 5 is a block diagram showing an example wear detection system, according to some examples.

FIG. 5 is a block diagram showing an example wear detection system 224 of FIG. 2, according to some examples. The wear detection system 224 includes a set of components 510 that operate on a set of input data (e.g., signal strength indicators of radio-frequency (RF) signals exchanged between two or more integrated communication devices of the client device 102). For example, the wear detection system 224 includes a signal transmission module 512, a signal strength module 514, and an AR experience operation adjustment module 519.

In some examples, the wear detection system 224 transmits a radio signal from a first communication device of a wearable device to a second communication device of the wearable device. The wear detection system 224 measures a signal strength associated with the radio signal received by the second communication device and compares the signal strength to a threshold value. The wear detection system 224 generates an indication of a wear status associated with the wearable device based on comparing the signal strength to the threshold value.

The first communication device can include an RF transmitter and the second communication device can include an RF receiver. The first and second communication devices can include Bluetooth or WiFi communication devices. The first communication device can be mounted on the wearable device on an opposite side from the second communication device.

In some examples, the wear detection system 224 determines that the signal strength transgresses the threshold value. In such cases, the wear detection system 224, in response to determining that the signal strength transgresses the threshold value, updates the indication of the wear status to indicate that the wearable device is not being worn by a user. The first communication device can be mounted on the wearable device relative to the second communication device in a position that maximizes the signal strength in absence of the wearable device being worn.

In some examples, the wear detection system 224 determines that the signal strength fails to transgress the threshold value. The wear detection system 224, in response to determining that the signal strength fails to transgress the threshold value, updates the indication of the wear status to indicate that the wearable device is being worn by a user.

In some examples, the wear detection system 224 configures the first and second communication devices to excite surface waves along a perimeter of a body part of a user over which the wearable device is configured to be worn. In such cases, the signal strength is below the threshold in absence of the body part and the signal strength is above the threshold in presence of the body part. The body part can include at least one of a wrist, skull, waist, or finger. The wear detection system 224 determines that the signal strength fails to transgress the threshold value. The wear detection system 224, in response to determining that the signal strength fails to transgress the threshold value, updates the indication of the wear status to indicate that the wearable device is not being worn by a user.

In some examples, the wear detection system 224 determines that the signal strength transgresses the threshold value. In response to determining that the signal strength fails to transgress the threshold value, the wear detection system 224 updates the indication of the wear status to indicate that the wearable device is being worn by a user.

In some examples, the wear detection system 224 instructs the user to wear the wearable device. While the wearable device is being worn by the user, the wear detection system 224 generates the surface waves and computes a reference signal strength of the radio signal received by the second communication device while the wearable device is being worn by the user. The wear detection system 224 stores the reference signal strength as the threshold value.

In some examples, the wear detection system 224 performs a set of operations in response to determining that the wear status indicates the wearable device is being worn by a user. The wear detection system 224 prevents the set of operations from being performed in response to determining that the wear status indicates the wearable device is not being worn by the user. The wear detection system 224, by preventing the set of operations from being performed, causes the wearable device to consume less power than when the set of operations are being performed. The set of operations can include at least one of activating a display of the wearable device, activating touch sensors of the wearable device, or activating an audio device of the wearable device. The wearable device can include AR glasses or a VR head-mounted device.

In some examples, the signal transmission module 512 enters into a configuration mode. In this mode, the signal transmission module 512 measures the signal strength of a radio signal transmitted by a first communication device of a client device 102 and received by a second communication device of the client device 102 under different scenarios. In a first scenario, the radio signal strength is configured to maximize when the client device 102 is not worn by a user. Under these circumstances, there is no path or a minimal path of physical interference (e.g., a body part of the user) within a radio signal transmission path between the first and second communication devices. In this case, the signal transmission module 512 transmits the radio signal from the first communication device to the second communication device. The signal strength module 514 measures the received signal strength indicator (RSSI) of the signal received by the second communication device. The signal strength module 514 stores this RSSI as a threshold value representing a wear status indicating that the client device 102 is not being worn.

Then, an interference source, such as a body part, is placed within the signal transmission path from the first communication device to the second communication device. The signal strength module 514 measures the received signal strength indicator (RSSI) of the signal received by the second communication device. The signal strength module 514 stores this RSSI as a threshold value representing a wear status indicating that the client device 102 is being worn. This RSSI can be lower than the RSSI in the absence of the body part which is indicative of the fact that the client device 102 is being worn.

Figure 6:
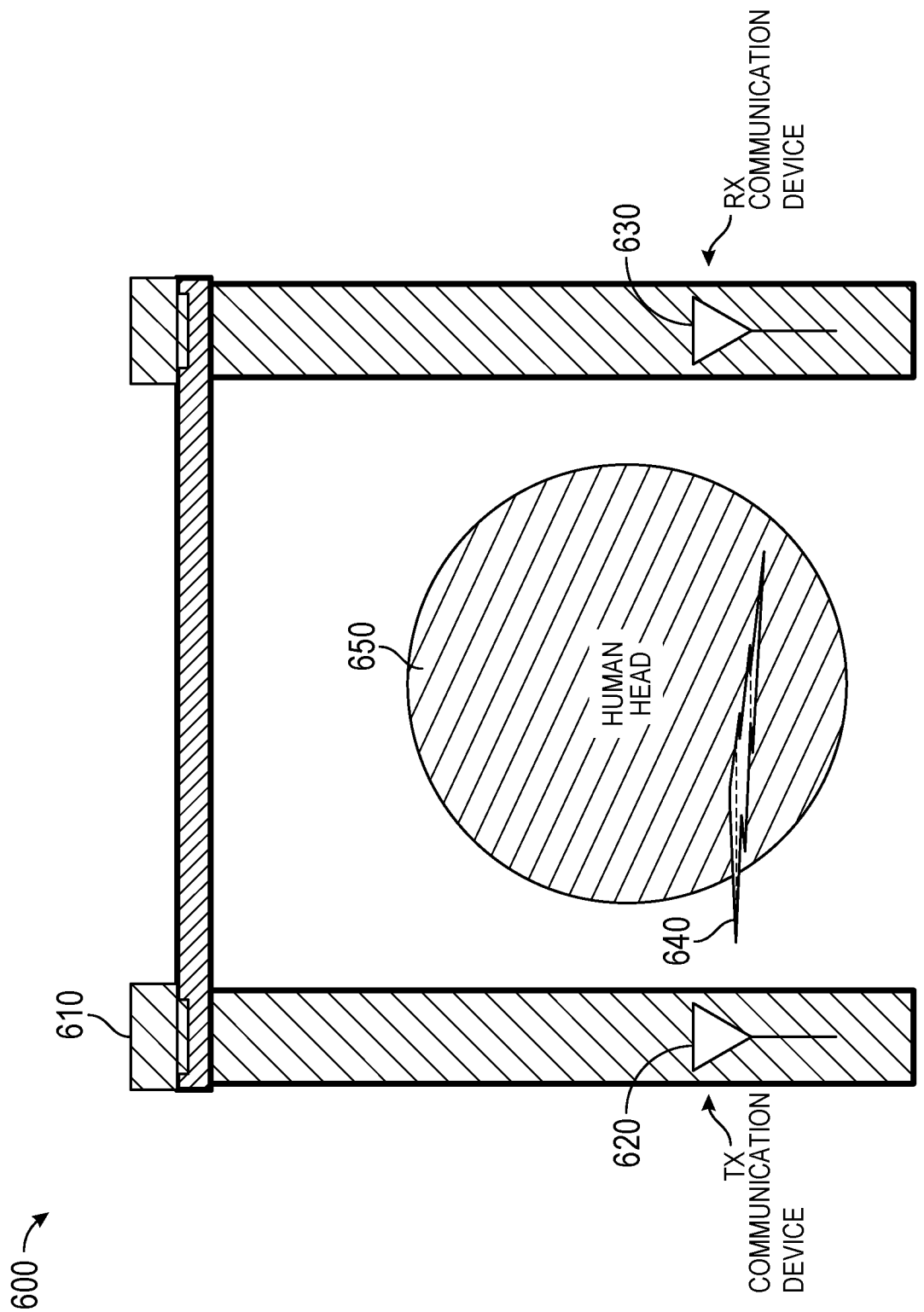
FIGS. 6, 7, and 8 are diagrammatic representations of the wear detection system, in accordance with some examples.

For example, as shown in FIG. 6, a client device 600 (corresponding to client device 102 of FIG. 1) can be provided that implements the wear detection system 224 of FIG. 2. The client device 600 can include a first communication device 620 (e.g., an RF transmitter) and a second communication device 630 (e.g., an RF receiver). The first communication device 620 and the second communication device 630 can both be integrated into a physical body 610 of the client device 600. For example, the client device 600 can include AR glasses. In such cases, the first communication device 620 and the second communication device 630 can be embedded in respective temples of the glasses, such as in the portions of the temples that are placed over the user's ears. In other arrangements, the first communication device 620 and the second communication device 630 can be integrated in the hinges or end pieces of the glasses.

During use, the client device 600 can be worn by the user, such as over a human head 650. A radio signal 640 can be transmitted periodically or continuously (or in response to detecting a contextual event) using the signal transmission module 512 of FIG. 5 by the first communication device 620 towards the second communication device 630. The signal strength module 514 of FIG. 5 can compute the RSSI of the radio signal received by the second communication device 630. The signal strength module 514 can compare the RSSI of the received signal to a signal strength threshold. In response to determining that the RSSI is below or fails to transgress the threshold, the signal strength module 514 determines that the client device 600 is being worn by the user.

Figure 7:
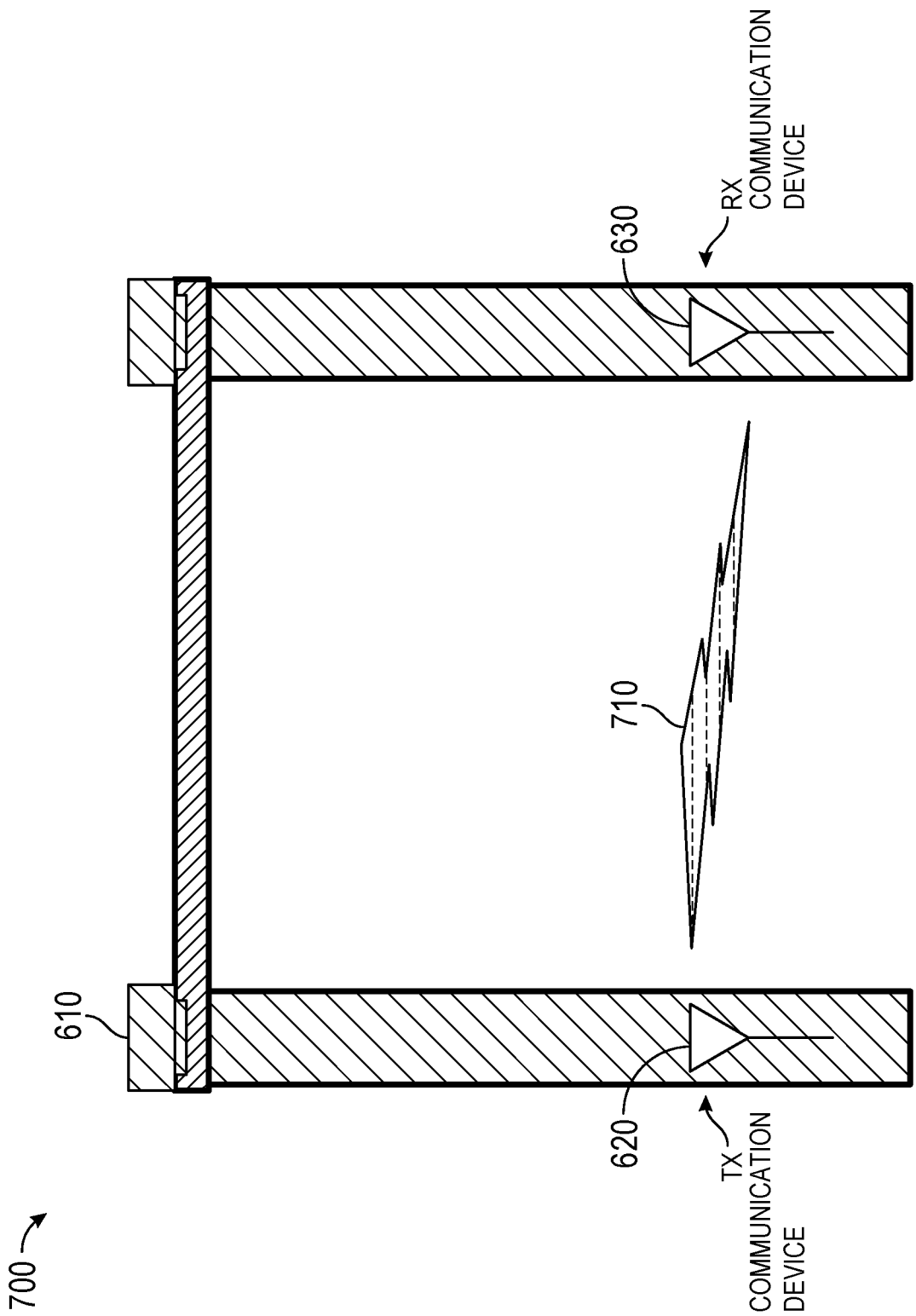

At a later time, as shown in FIG. 7, the client device 700 which can be the same as client device 600 of FIG. 6 can be removed from being worn by the user. In such cases, the radio signal 710 can be transmitted periodically or continuously (or in response to detecting a contextual event) using the signal transmission module 512 of FIG. 5 by the first communication device 620 towards the second communication device 630. The signal strength module 514 of FIG. 5 can compute the RSSI of the radio signal received by the second communication device 630. The signal strength module 514 can compare the RSSI of the received signal to a signal strength threshold. In response to determining that the RSSI is above or transgresses the threshold, the signal strength module 514 determines that the client device 600 is not being worn by the user. In response, the signal strength module 514 can send a wear status update or indication to the AR experience operation adjustment module 519 of FIG. 5.

In some examples, the AR experience operation adjustment module 519 can receive the wear status from the signal strength module 514. In response, the AR experience operation adjustment module 519 selects different operations to execute or prevent execution based on the current wear status indicator received from the signal strength module 514. For example, the AR experience operation adjustment module 519 can access a build of the AR experience that is associated with a lower power consumption value in response to determining that the wear status indicates that the client device 102 of FIG. 1 is not being worn. Specifically, the client device 102 can store multiple builds of the same AR experience, each associated with a different power consumption amount. The client device 102 can detect or receive the wear status and, in response to detecting that the client device 102 is being worn, the AR experience operation adjustment module 519 accesses and launches the build associated with the greatest power consumption amount. After receiving an updated wear status indicating the client device is not being worn, the AR experience operation adjustment module 519 accesses a second build of the same AR experience and launches the second build, which can be associated with a lower power consumption value or can turn OFF one or more features of the client device 102 entirely.

In some examples, the wear detection system 224 is configured to determine a wear status indicating that the client device is being worn by a user in response to determining that the RSSI of the radio signal received by the second communication device 630 transgresses the threshold. In such cases, the signal transmission module 512 can be configured to generate a radio signal for transmission from the first communication device to the second communication device using beamforming techniques or by leveraging surface waves created by an interference source placed in the communications path of the radio signal. To do so, the signal transmission module 512 can be in a training state. In the training state, the signal transmission module 512 instructs a user to wear the client device 102 over a body part, such as on top of the user's head. After receiving confirmation from the user that the client device 102 has been worn, the signal transmission module 512 can generate a radio signal that maximizes its RSSI observed by the receiver. Namely, the signal transmission module 512 can leverage surface waves and beamforming techniques to direct the radio signal around the body part from the transmitter communication device to the receiver communication device.

The signal transmission module 512 can compute the RSSI observed by the receiver device and can store that value as a threshold value used to determine whether the client device 102 is being worn by the user. The signal transmission module 512 can also store the transmitter device configuration or beamforming parameters used to achieve this particular RSSI, indicating that the client device 102 is being worn. The signal transmission module 512 can instruct the user to remove the client device 102 and can generate, again, the radio signal without applying beamforming or leveraging surface waves. The signal transmission module 512 measures the RSSI of the signal observed or received by the receiver device and stores that as the threshold indicating that the client device 102 is not being worn. This completes the configuration of the system.

Figure 8:
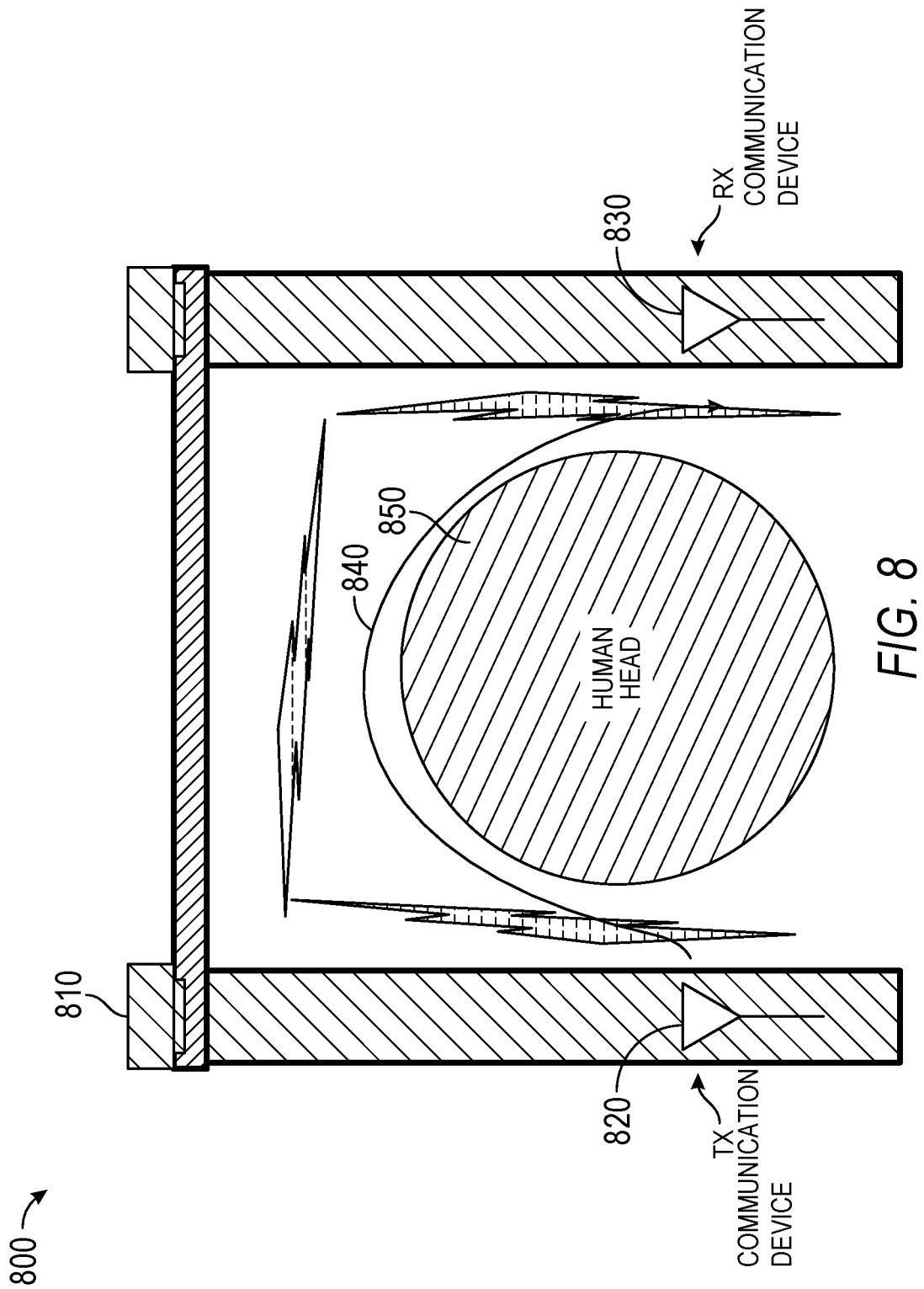

The wear detection system 224, during use, can detect that the client device 102 is being worn by the user by comparing the RSSI of the radio signal transmitted by the transmitter using beamforming parameters or surface waves and directed towards the receiver device. For example, as shown in FIG. 8, the client device 800 can include a wearable device 810 (which can be the same as the client device 102 of FIG. 1) in which is integrated a first communication device 820 and a second communication device 830. The first communication device 820 may have been trained and initialized with a certain set of beamforming parameters to direct a radio signal towards the second communication device 830 around a human head or body part 850. Particularly, the signal transmission module 512 can periodically or continuously (or in response to detecting a contextual event) instruct the first communication device 820 to generate and transmit a radio signal using predefined beamforming parameters.

The radio signal can be directed along a path 840 around the head or body part 850 towards the second communication device 830. The signal strength module 514 of FIG. 5 measures the RSSI of the signal received along the path 840. The signal strength module 514 compares the RSSI to the threshold indicating that the client device 800 is being worn. In response to determining that the RSSI transgresses the threshold, the signal strength module 514 generates a wear status indicating that the client device 800 is being worn. After the client device 800 is removed from being worn, the signal strength module 514 again measures the RSSI of the signal observed by the second communication device 630 of FIG. 6. In response to determining that the RSSI fails to transgress the threshold, indicating that the device is being worn and/or if the RSSI corresponds to the threshold, indicating that the device is not being worn, the signal strength module 514 generates a wear status indicating that the client device 800 is not being worn. The AR experience operation adjustment module 519 of FIG. 5 receives the wear status signal and modifies operations based on the wear status to conserve or reduce battery or resource consumption.

Figure 9:
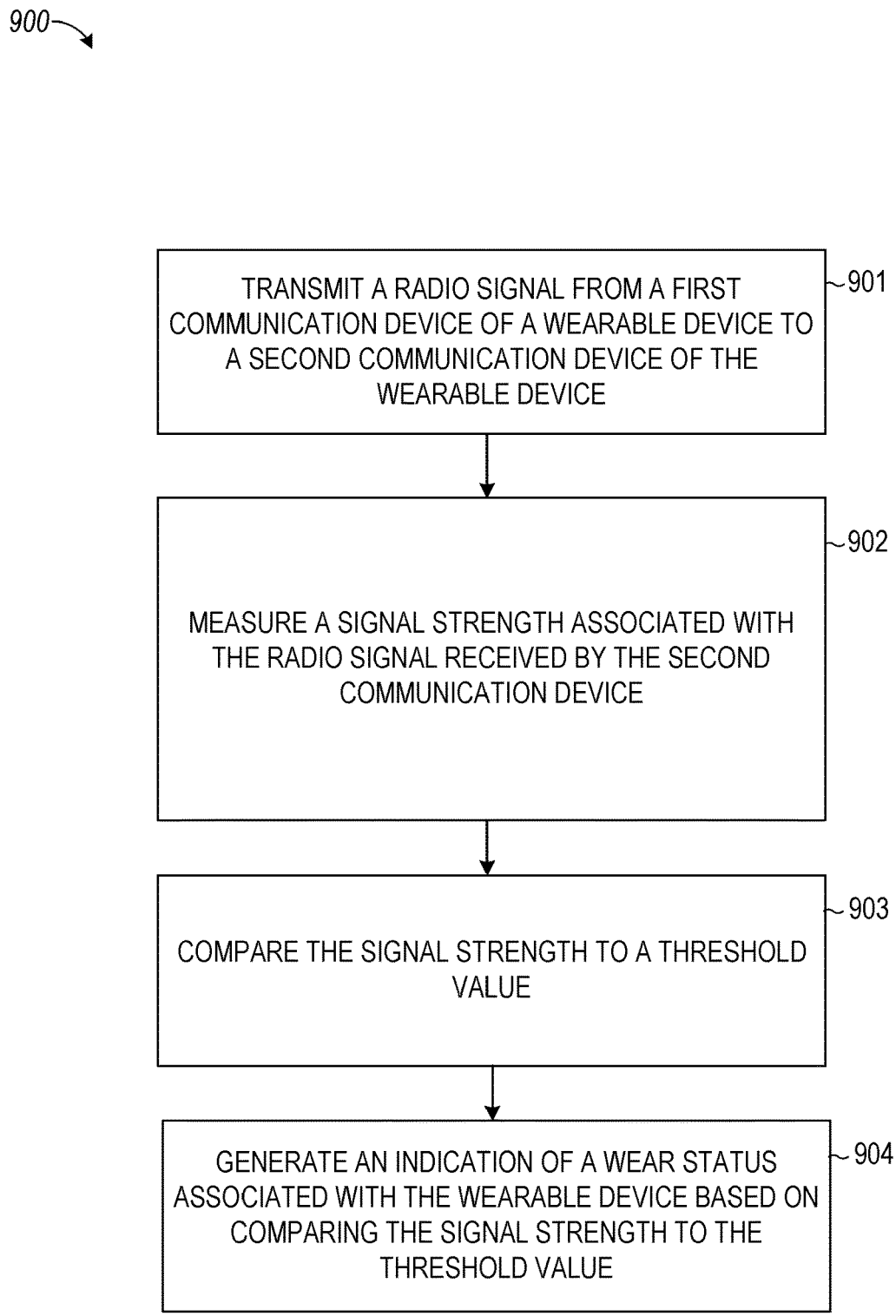
FIG. 9 is a flowchart illustrating example operations of the wear detection system, according to some examples.

FIG. 9 is a flowchart of a process 900 performed by the wear detection system 224 of FIG. 2, in accordance with some example examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the wear detection system 224 (e.g., a client device 102 of FIG. 1, or a server) transmits a radio signal from a first communication device of a wearable device to a second communication device of the wearable device, as discussed above.

At operation 902, the wear detection system 224 measures a signal strength associated with the radio signal, received by the second communication device, as discussed above.

At operation 903, the wear detection system 224 compares the signal strength to a threshold value, as discussed above.

At operation 904, the wear detection system 224 generates an indication of a wear status associated with the wearable device based on comparing the signal strength to the threshold value, as discussed above.

Machine Architecture

Figure 10:
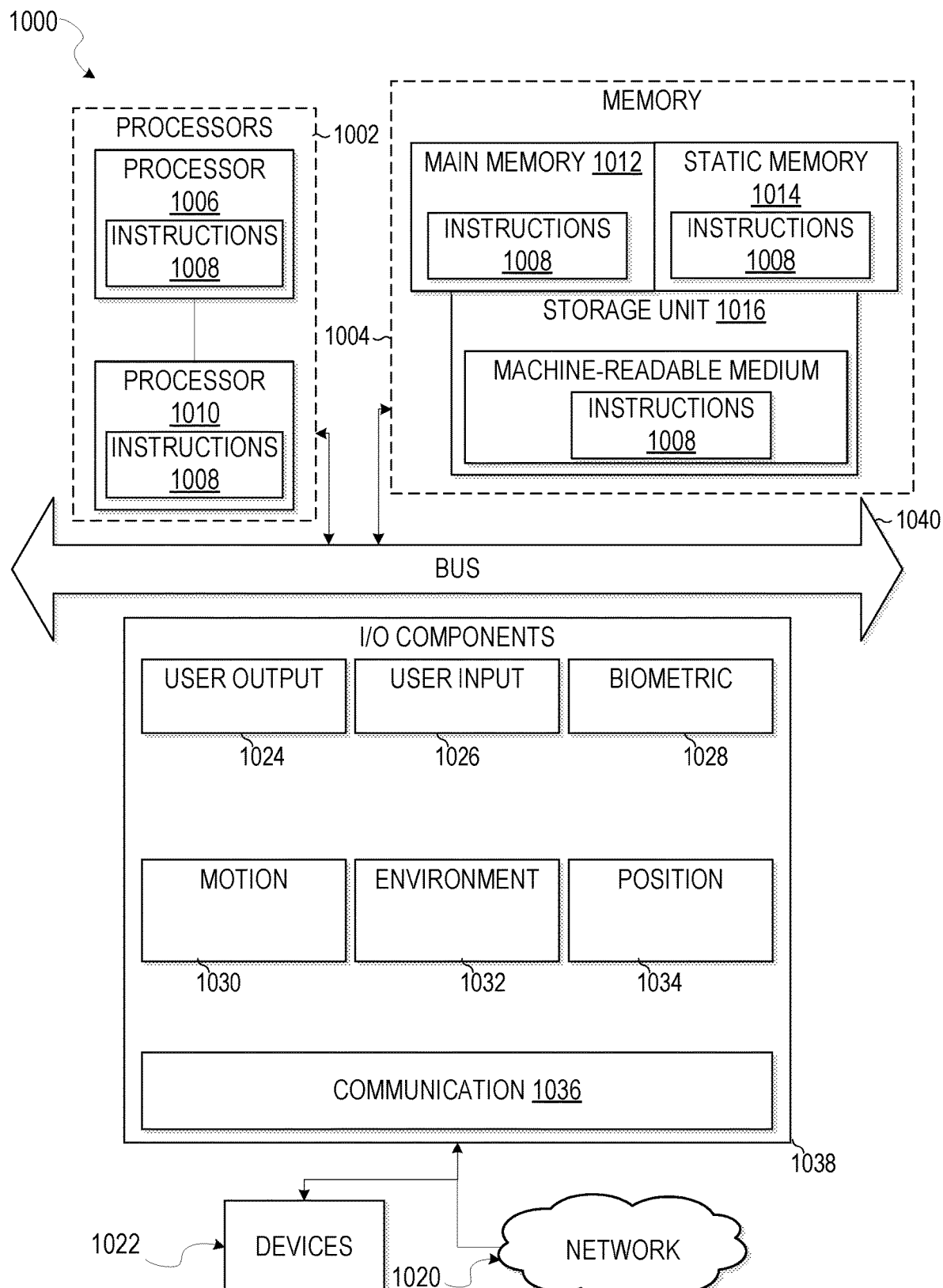
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code), for causing the machine 1000 to perform any one or more of the methodologies discussed herein, may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a PC, a tablet computer, a laptop computer, a netbook, a STB, a PDA, an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a CPU, a Reduced Instruction Set Computing (RISC) Processor, a Complex Instruction Set Computing (CISC) Processor, a GPU, a Digital Signal Processor (DSP), an Application Specific Integrated Circuit (ASIC), a Radio-Frequency Integrated Circuit (RFIC), another processor, or any suitable combination thereof) may include a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, and rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 of FIG. 1 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1034 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth ° components (e.g., Bluetooth ° Low Energy), WiFi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., HTTP). Similarly, the instructions 1008 may be transmitted or received using a transmission medium via a coupling (e.g., a peer-to-peer coupling) to the devices 1022.

Software Architecture

Figure 11:
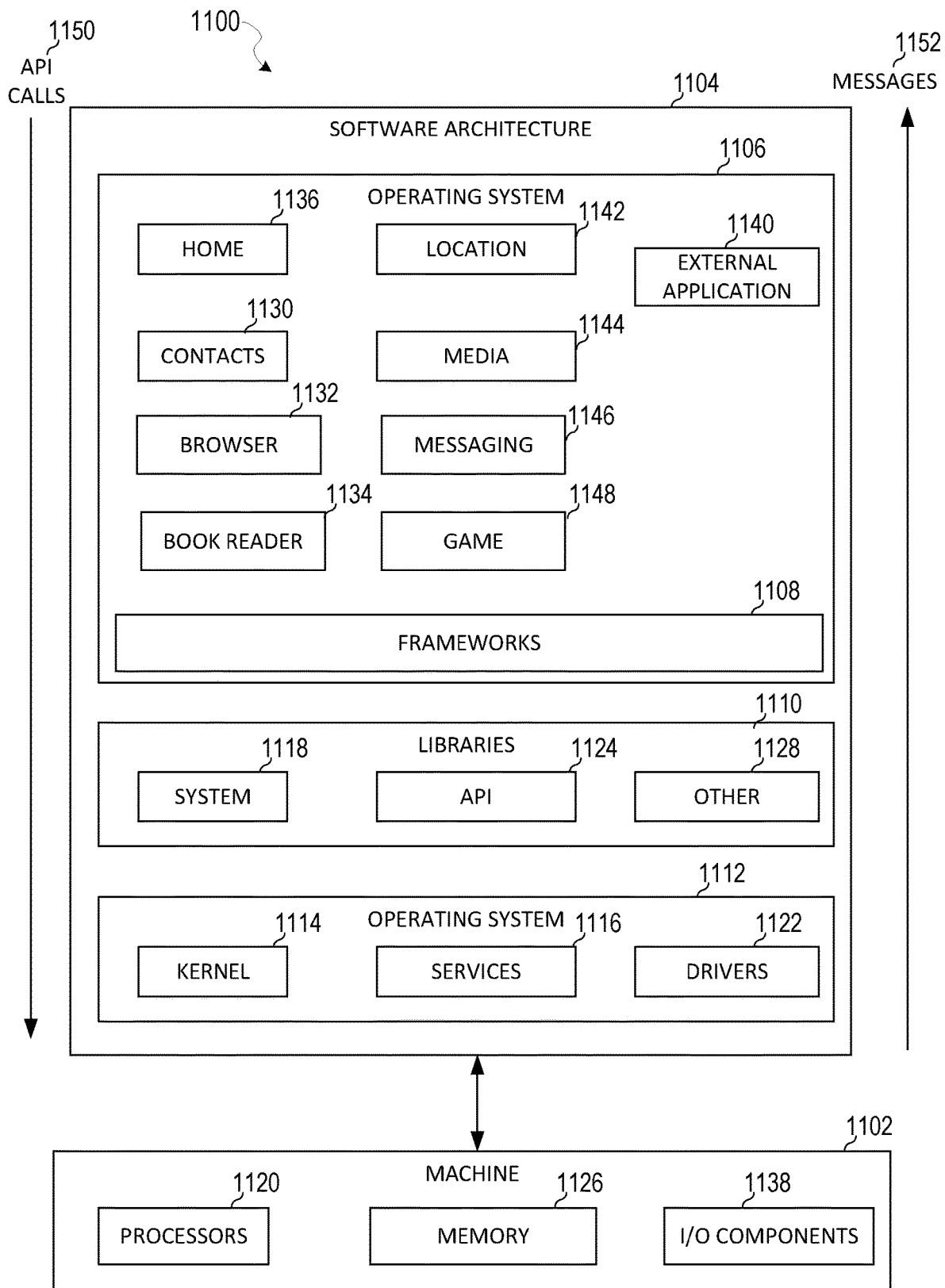
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various GUI functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, STBs, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and/or the like. The access time for the ephemeral message may be set by the message sender. Alternatively, the access time may be a default setting, or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
configuring first and second communication devices to excite radio surface waves along a perimeter of a body part of a user over which a wearable device is being worn;
applying one or more beamforming techniques to direct a radio signal comprising the radio surface waves from the first communication device of the wearable device to the second communication device of the wearable device to maximize a signal strength observed by the second communication device;
generating a first radio signal using the one or more beamforming techniques to determine that the wearable device is being worn;
generating a second radio signal without using the one or more beamforming techniques to determine that the wearable device is not being worn;
measuring a signal strength associated with the first or second radio signal received by the second communication device;
comparing the signal strength to a threshold value;
generating an indication of a wear status associated with the wearable device based on the comparing of the signal strength to the threshold value;
receiving, from an interaction application, input from the wearable device that selects an augmented reality (AR) experience of the same wearable device; and
selecting between different versions of the same AR experience that has been selected by the input based on the wear status associated with the wearable device, the selecting comprising:
accessing a first build of the AR experience implemented by the same wearable device that is associated with a first power consumption value in response to determining that the wear status indicates the wearable device is being worn by a user; and
accessing a second build of the AR experience implemented by the same wearable device that is associated with a second power consumption value in response to determining that the wear status indicates the wearable device is not being worn by the user, the second build of the AR experience being associated with a lower power consumption value than the first build of the AR experience.

2. The method of claim 1, further comprising:
detecting a contextual event; and
causing generation of the radio signal using the one or more beamforming techniques in response to detecting the contextual event.

3. The method of claim 1, further comprising:
determining that the signal strength fails to transgress the threshold value; and in response to determining that the signal strength fails to transgress the threshold value, updating the indication of the wear status to indicate that the wearable device is being worn by a user.

4. The method of claim 1, further comprising:
causing generation of the radio signal using the one or more beamforming techniques in response to receiving confirmation from the user that the wearable device is being worn, and
storing beamforming parameters used to achieve the maximized signal strength of the radio signal in association with the first and second communication devices, the maximized signal strength being stored as the threshold value indicative of the wearable device being worn.

5. The method of claim 4, further comprising:
instructing the user to remove the wearable device after triggering the generation of the radio signal using the one or more beamforming techniques; and
after instructing the user to remove the wearable device after triggering the generation of the radio signal using the one or more beamforming techniques, generating, without applying the one or more beamforming techniques, a second radio signal for transmission from the first communication device to the second communication device.

6. The method of claim 5, wherein the body part comprises a wrist, skull, waist, or finger, further comprising storing a new signal strength of the second radio signal observed by the second communication device as a new threshold indicative of the wearable device not being worn.

7. The method of claim 4, further comprising:
determining that the signal strength fails to transgress the threshold value; and
in response to determining that the signal strength fails to transgress the threshold value, updating the indication of the wear status to indicate that the wearable device is not being worn by a user.

8. The method of claim 4, further comprising:
determining that the signal strength transgresses the threshold value; and
in response to determining that the signal strength fails to transgress the threshold value, updating the indication of the wear status to indicate that the wearable device is being worn by a user.

9. The method of claim 4, further comprising:
instructing the user to wear the wearable device;
while the wearable device is being worn by the user, generating surface waves;
computing a reference signal strength of the radio signal received by the second communication device while the wearable device is being worn by the user; and
storing the reference signal strength as the threshold value.

10. The method of claim 1, wherein the first communication device comprises a transmitter, and wherein the second communication device comprises a receiver.

11. The method of claim 1, wherein the first and second communication devices comprise Bluetooth or WiFi communication devices.

12. The method of claim 1, wherein the first communication device is mounted on the wearable device on an opposite side from the second communication device.

13. The method of claim 1, wherein the first communication device is mounted on the wearable device relative to the second communication device in a position that maximizes the signal strength in absence of the wearable device being worn.

14. The method of claim 1, further comprising preventing a set of operations from being performed that causes the wearable device to consume less power than when the set of operations are being performed.

15. The method of claim 1, wherein the wearable device comprises augmented reality (AR) glasses, wherein the first and second communication devices are integrated in hinges of the AR glasses.

16. The method of claim 1, wherein the wearable device comprises AR glasses, wherein the first and second communication devices are embedded in respective portions of temples of the AR glasses that are placed over ears.

17. A system comprising:
at least one processor of a device; and
a memory component having instructions stored thereon that, when executed by the at least one processor, cause the at least one processor to perform operations comprising:
configuring first and second communication devices to excite radio surface waves along a perimeter of a body part of a user over which a wearable device is being worn;
applying one or more beamforming techniques to direct a radio signal comprising the radio surface waves from the first communication device of the wearable device to the second communication device of the wearable device to maximize a signal strength observed by the second communication device;
generating a first radio signal using the one or more beamforming techniques to determine that the wearable device is being worn;
generating a second radio signal without using the one or more beamforming techniques to determine that the wearable device is not being worn;
measuring a signal strength associated with the first or second radio signal received by the second communication device;
comparing the signal strength to a threshold value;
generating an indication of a wear status associated with the wearable device based on the comparing of the signal strength to the threshold value;
receiving, from an interaction application, input from the wearable device that selects an augmented reality (AR) experience of the same wearable device; and
selecting between different versions of the same AR experience that has been selected by the input based on the wear status associated with the wearable device, the selecting comprising:
accessing a first build of the AR experience implemented by the same wearable device that is associated with a first power consumption value in response to determining that the wear status indicates the wearable device is being worn by a user; and
accessing a second build of the AR experience implemented by the same wearable device that is associated with a second power consumption value in response to determining that the wear status indicates the wearable device is not being worn by the user, the second build of the AR experience being associated with a lower power consumption value than the first build of the AR experience.

18. A non-transitory computer-readable storage medium having stored thereon instructions that, when executed by at least one processor of a device, cause the at least one processor to perform operations comprising:

configuring first and second communication devices to excite radio surface waves along a perimeter of a body part of a user over which a wearable device is being worn;

applying one or more beamforming techniques to direct a radio signal comprising the radio surface waves from the first communication device of the wearable device to the second communication device of the wearable device to maximize a signal strength observed by the second communication device;

generating a first radio signal using the one or more beamforming techniques to determine that the wearable device is being worn;

generating a second radio signal without using the one or more beamforming techniques to determine that the wearable device is not being worn;

measuring a signal strength associated with the first or second radio signal received by the second communication device;

comparing the signal strength to a threshold value;

generating an indication of a wear status associated with the wearable device based on the comparing of the signal strength to the threshold value;

receiving, from an interaction application, input from the wearable device that selects an augmented reality (AR) experience of the same wearable device; and selecting between different versions of the same AR experience that has been selected by the input based on the wear status associated with the wearable device, the selecting comprising:

accessing a first build of the AR experience implemented by the same wearable device that is associated with a first power consumption value in response to determining that the wear status indicates the wearable device is being worn by a user; and accessing a second build of the AR experience implemented by the same wearable device that is associated with a second power consumption value in response to determining that the wear status indicates the wearable device is not being worn by the user, the second build of the AR experience being associated with a lower power consumption value than the first build of the AR experience.

19. The non-transitory computer-readable storage medium of claim 18, the operations further comprising:

detecting a contextual event; and causing generation of the radio signal using the one or more beamforming techniques in response to detecting the contextual event.

\* \* \* \* \*